US010293663B2

(12) United States Patent
Andersson et al.

(10) Patent No.: US 10,293,663 B2
(45) Date of Patent: May 21, 2019

(54) PROTECTIVE WINDSHIELD ARRANGEMENT

(71) Applicant: HAMMERGLASS AB, Förslöv (SE)

(72) Inventors: Peter Andersson, Förslöv (SE); Kenneth Svensson, Förslöv (SE)

(73) Assignee: HAMMERGLASS AB, Förslöv (SE)

(*) Notice: Subject to any disclaimer, the term of this patent is extended or adjusted under 35 U.S.C. 154(b) by 102 days.

(21) Appl. No.: 15/550,301

(22) PCT Filed: Feb. 5, 2016

(86) PCT No.: PCT/EP2016/052558
§ 371 (c)(1),
(2) Date: Aug. 10, 2017

(87) PCT Pub. No.: WO2016/128328
PCT Pub. Date: Aug. 18, 2016

(65) Prior Publication Data
US 2018/0056759 A1    Mar. 1, 2018

(30) Foreign Application Priority Data
Feb. 12, 2015   (EP) .................................... 15154893

(51) Int. Cl.
*B60J 1/00*    (2006.01)
*F41H 5/26*    (2006.01)
(Continued)

(52) U.S. Cl.
CPC ................ *B60J 1/007* (2013.01); *B60J 1/02* (2013.01); *B60J 1/10* (2013.01); *F41H 5/263* (2013.01)

(58) Field of Classification Search
CPC ...... B60J 1/007; B60J 1/02; B60J 1/10; F41H 5/263
(Continued)

(56) References Cited

U.S. PATENT DOCUMENTS 3,382,630 A     5/1968  Chivers
3,923,339 A *  12/1975  McDonald .............. B60R 21/12
                                                160/370.21
(Continued)

FOREIGN PATENT DOCUMENTS

EP          2 626 293 A1      8/2013
WO    WO 2010/056845 A2      5/2010

OTHER PUBLICATIONS

International Search Report and Written Opinion dated May 3, 2016 in corresponding International Application No. PCT/EP2016/052558.

*Primary Examiner* — Jason S Morrow
*Assistant Examiner* — E Turner Hicks
(74) *Attorney, Agent, or Firm* — Michael J. D'Angelo; Haug Partners LLP

(57) ABSTRACT

The present invention relates to a shock absorbing vehicle window arrangement for a vehicle cab, the window arrangement comprises a transparent polymer windshield, a metal frame having a width extending in the direction parallel to the plane of the transparent polymer windshield and a depth extending in the direction perpendicular to the plane of the transparent polymer windshield, the metal frame comprising: an outer portion, at least partially extending on the outside of the transparent polymer windshield, and an inner portion, at least partially extending on the inside of the transparent polymer windshield. The outer portion overlaps the transparent polymer windshield with at least 0.5% of the length of the windshield, in the direction extending perpendicular from the length axis of the portion of the metal frame that extends on the outside of the transparent polymer windshield, the metal frame comprises a horizontally extending portion comprising a flexible portion.

14 Claims, 5 Drawing Sheets

(51) Int. Cl.
*B60J 1/02* (2006.01)
*B60J 1/10* (2006.01)

(58) Field of Classification Search
USPC .................. 296/201, 84.1, 96.21, 146.15
See application file for complete search history.

(56) References Cited

U.S. PATENT DOCUMENTS

| | | | |
|---|---|---|---|
| 4,204,374 A * | 5/1980 | Olson | B32B 27/08 244/121 |
| 4,777,699 A * | 10/1988 | Hill | B60J 1/14 16/225 |
| 8,267,003 B1 | 9/2012 | Lou et al. | |
| 8,998,297 B1 * | 4/2015 | Khaykin | B60J 1/007 296/187.03 |
| 9,254,907 B2 * | 2/2016 | Deganis | B64C 1/1492 |
| 9,334,041 B2 * | 5/2016 | Edmond | B64D 47/06 |
| 2012/0175908 A1 * | 7/2012 | McCarthy | B32B 17/10036 296/84.1 |

* cited by examiner

PROTECTIVE WINDSHIELD ARRANGEMENT

FIELD OF THE INVENTION

The present invention relates to a protective windshield arrangement, more specifically a protective windshield arrangement comprising polycarbonate allowing users to feel safe, by providing a user friendly, more efficient and competitive invention.

TECHNICAL BACKGROUND

On construction sites, explosives are commonly used for altering the terrain and for demolition purposes. Construction grade explosives are most often used as several smaller charges placed in drilled holes in the rock or construction to be blasted. The charges are electrically connected to a detonator and are detonated simultaneously or in a synchronized pattern. Due to the large amount of charges, there is always a risk of one or more charges failing, which could be a result of a problem with the explosives or with the electrical connection with the detonator. When an excavator or similar heavy machinery works in the rockfill, the risk of the excavator accidentally squeezing or hitting a dud with enough force to cause it to detonate is quite substantial. Exploding duds creates a blast shock wave against the excavator and rockfill or other matter may be thrown against the excavator at speeds similar to that of a speeding bullet.

SUMMARY OF THE INVENTION

One aim of the present invention is to provide the user with a product that the end user find easy to install, is more efficient and compatible with existing equipment than the available alternatives and is safe.

The purpose above is achieved by a shock absorbing vehicle window arrangement for a vehicle cab, the window arrangement comprises a transparent polymer windshield, a metal frame having a width extending in the direction parallel to the plane of the transparent polymer windshield and a depth extending in the direction perpendicular to the plane of the transparent polymer windshield. The metal frame comprising: an outer portion, at least partially extending on the outside of the transparent polymer windshield, and an inner portion, at least partially extending on the inside of the transparent polymer windshield. The outer portion overlaps the transparent polymer windshield with at least 0.5% of the length of the windshield, in the direction extending perpendicular from the length axis of the portion of the metal frame that extends on the outside of the transparent polymer windshield, the metal frame comprises a horizontally extending portion comprising a flexible portion having a depth which is less than half of the width of the flexible portion, and the transparent polymer windshield comprises through holes adapted to receive fixating screws for fixating the transparent polymer windshield to the metal frame, and the through holes have a cross sectional area being at least 1.5 times the cross sectional area of the screws, enabling movement between the metal frame and the transparent polymer windshield, such that the absorbing vehicle window arrangement is more flexible along a horizontal direction than along a vertical direction.

In another specific embodiment the shock absorbing vehicle window arrangement comprises through holes that are Stadium shaped holes which allows the screw placed in the stadium shaped through hole to be moved more along a length axis of the stadium shaped through hole than in a perpendicular direction.

In yet another embodiment of the shock absorbing vehicle window arrangement, the length of the stadium shaped holes are extending in a direction facing the center of the transparent polymer windshield such that the windshield can obtain maximum flexibility.

In another embodiment, the shock absorbing vehicle window arrangement further comprises a first and second side window.

In another specific embodiment the angles between the planes of the side windows and the plane of the transparent polymer windshield that can be adjusted by the flexibility of the flexible portion, such that the shock absorbing vehicle window arrangement can be adjusted when fitted in a vehicle cab.

In yet another embodiment the shock absorbing vehicle window arrangement comprises an overlap and in one embodiment the overlap is exceeding 20 mm such that the transparent polymer windshield is supported by the metal frame.

In another embodiment of the shock absorbing vehicle window arrangement the transparent polymer windshield is made from Polycarbonate.

In another embodiment of the shock absorbing vehicle window arrangement the metal frame extends along the entire outer edge of the transparent polymer windshield and in one embodiment the metal frame further comprises an inner portion, and the transparent polymer windshield is adapted to be placed between the inner portion and the portion extending on the outside of the transparent polymer windshield.

In another embodiment the shock absorbing vehicle window arrangement further comprises at least one fixation element for fixating the shock absorbing vehicle window arrangement to a vehicle cab.

In another embodiment of the shock absorbing vehicle window arrangement the shock absorbing vehicle window arrangement comprises the at least one fixation element, and a second fixation element, and the two fixation elements are placed such that the flexible portion is placed between the two fixation elements, such that the flexible portion enables a variation of the distance between the two fixation elements exceeding 10 mm.

In another embodiment of the shock absorbing vehicle window arrangement the fixation elements are materially integrated in the inner portion of the metal frame. In yet another embodiment of the shock absorbing vehicle window arrangement a center point of the transparent polymer windshield can be moved one of at least 2.0%, at least 3% and at least 4.0% in relation to the metal frame. There are several advantages with the present invention and among those, a product that provides the user with a versatile, flexible and safe alternative.

Please note that the embodiments above can be combined within the scope of the appended claims unless such combinations are clearly contradictory.

BRIEF DESCRIPTION OF THE DRAWINGS

FIG. 3A shows one embodiment of a shock absorbing vehicle window arrangement, illustrating the angel α between the front window and the side window perspective view.

Figure 1A:
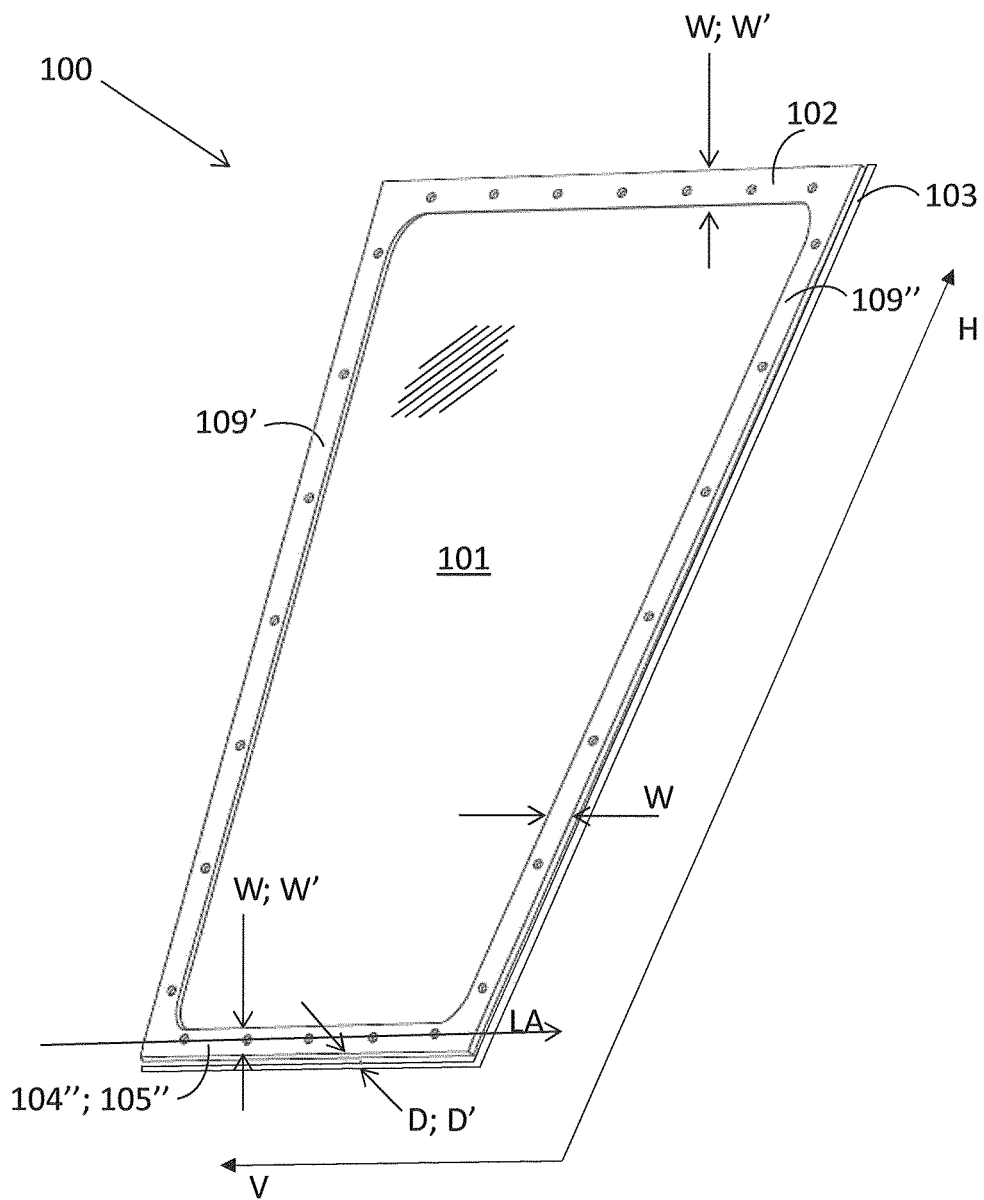
FIG. 1A shows one embodiment of a shock absorbing vehicle window arrangement, comprising a transparent polymer windshield 101, a metal frame 102, 103 having a width W extending in the direction parallel to the plane of the transparent polymer windshield 101 and a depth D extending in the direction perpendicular to the plane of the transparent polymer windshield 101, wherein the metal frame 102, 103 comprises a horizontally extending portion 104', 104", and wherein the horizontally extending portion 104', 104" comprises a flexible portion 105', 105" having a depth D' front view.

It should be noted that the shock absorbing window arrangement according to the present invention of course may comprise different standard components, also having varied design, which are not explicitly mentioned. Moreover, the design of the shock absorbing window arrangement may vary, and the present invention, as formulated in claim 1, should be seen as embodying different forms of the arrangement.

DETAILED DESCRIPTION

When an excavator or similar heavy machinery works in the rockfill, the risk of the excavator accidentally squeezing or hitting a dud with enough force to cause it to detonate is quite substantial. Exploding duds creates a blast shock wave against the excavator and rockfill or other matter may be thrown against the excavator at speeds similar to that of a speeding bullet. Further to that, the blast is followed by a vacuum creating a suction towards the detonation site that risks sucking the machine operator from the cab if the windshield is damaged or comes lose.

The use of protective windscreens and safety glass has long been known. The use within armored cars and protective goggles or glasses is only a few examples of areas of use. Within the field of heavy duty equipment vehicles, there have been a long range of attempts to create safe windscreens that are able to uphold heavy impact and provide safety to the user. One problem is however that the construction often is specific for a certain vehicle and varies not only with different kinds of vehicles, but also within the same brand and/or sort of vehicle such as trailers, trucks, tractors, excavators etc. When it comes to heavy duty construction equipment, the need for a safety glass, preventing broken windows and injury caused by flying rockfill or explosions and the like is vital. Not all construction equipment is equipped with bullet proof or safety glass from the time of manufacturing. There is hence a need for an option to replace the original glass window. This implies a need for said vehicle to be rebuilt or modified in order to hold a safety glass, which in turn involves several hours in the workshop, still not necessarily leaving a satisfactory result of a perfect fit.

The shock absorbing vehicle window arrangement disclosed herein provides the end user with a versatile option allowing a more universal fit for aftermarket rebuilding/adjustment.

Transparent polymer is to be understood as any polymer material able to function as a window. Transparent polymer material could for example be acrylic glass, a polycarbonate, polyethylene terephthalate, an acrylic fiber material or a copolymer containing polyacrylonitrile.

Polycarbonate is to be understood as at least one polymer comprising a carbonate group (—O—(C=O)—O—). The chain may comprise a cyclic structure or linear structure that further may comprise various substances and groups such as for example, but not exclusively, F, Cl, CH3.

Flexibility is to be understood as materials ability to deform in a flexible way. A more flexible structure is to be understood as a structural element being able to endure deflection or displacement under load without plastic deformation. The flexibility of an object is referred to in relation to an original state compared to a deflection state.

Elasticity is to be understood as a materials ability to deform in an elastic way. Elastic deformation is when a material deforms under, but returns to its original shape when the stress is removed. A more elastic structure is to be understood as a structure having a lower modulus of elasticity. The elastic modulus of an object is defined as the of its stress-strain curve in the elastic deformation region. The elastic modulus is calculated as stress/strain, where stress is the force causing the deformation, divided by the area to which the force is applied; and is the ratio of the change caused by the stress.

Vacuum is to be understood as negative pressure i.e. pressure below atmospheric pressure and thus providing a suction to the surrounding area, it is not to be understood as an absolute vacuum.

Below, specific embodiments of the present invention are described.

It will be appreciated that the drawings are for illustration only and are not in any way restricting the scope of the invention. Thus, any references to directions, such as "up" or "down", are only referring to the directions shown in the figures. It should be noted that the features having the same reference numerals have the same function, a feature in one embodiment could thus be exchanged for a feature from another embodiment having the same reference numeral unless clearly contradictory. The descriptions of the features having the same reference numerals should thus be seen as complementing each other in describing the fundamental idea of the feature and thereby showing the features versatility.

FIG. 1A shows an embodiment of a shock absorbing vehicle window arrangement 100 for a vehicle cab. The vehicle cab could for example be a cab for an excavator, a dump truck, a wheel loader a roller or a crane. The window arrangement comprises a transparent polymer windshield 101 enclosed by a metal frame 102, 103 having a width W extending in the direction parallel to the plane of the transparent polymer windshield 101 and a depth D extending in the direction perpendicular to the plane of the transparent polymer windshield 101. The metal frame comprises an outer portion 102, being the portion 102 of the metal frame extending on the outside of the transparent polymer windshield 101, and an inner portion 103, being the portion of the metal frame extending on the inside of the transparent polymer windshield 101. The term windshield is not to be understood as limited to the front window of a vehicle cab, but rather as a term used for any transparent part of a vehicle cab including windows facing backwards and sideward in relation to the forward driving direction of the vehicle. According to the embodiment shown in FIG. 1, the outer portion 102 overlaps the transparent polymer windshield 101 with at least 0.5% of the length of the windshield in the direction extending perpendicular from the length axis LA of the outer portion 102 of the metal frame.

In the embodiment shown in FIG. 1A, the overlap exceeds 1% of the length of the windshield in the direction extending perpendicular from the length axis LA of the outer portion 102 of the metal frame, and in another conceivable embodiment the overlap exceeds 2% of the length of the windshield in the direction extending perpendicular from the length axis LA of the outer portion 102 of the metal frame and yet in another conceivable embodiment the overlap exceeds 3% of the length of the windshield in the direction extending perpendicular from the length axis LA of the outer portion 102 of the metal frame.

In the embodiment shown in FIG. 1A, the overlap exceeds 20 mm, and in another conceivable embodiment the overlap exceeds 10 mm, and in another conceivable embodiment the overlap exceeds 30 mm, another conceivable embodiment the overlap exceeds 40 mm.

As shown in FIG. 1, the absorbing window arrangement comprises an upper 104' and lower 104" horizontally extending portion, which portions in the embodiment of FIG. 1 is an integrated part of the metal frame 102,103 which encloses the entire edge of the transparent polymer windshield 101. In alternative embodiments, it is equally conceivable that the metal frame is comprised of several portions which are not materially integrated with each other.

The upper and lower horizontally extending portions 104', 104" each comprises a flexible portion 105', 105", which may be a small portion of the horizontally extending portions, such as the central portion, or which may be the entire horizontally extending portion 104', 104". The flexible portion has a depth D' which is less than half of the width W' of the flexible portion, such that the absorbing vehicle window arrangement 100 is flexible along a horizontal direction H.

The inner portion of the vertically extending portions of the metal frame 109', 109" is bent backwards, which makes the metal frame considerably stiffer in the vertical direction V than in the horizontal direction H.

The transparent polymer windshield 101 comprises through holes (shown in detail as 106 in FIG. 1E, 1F) which are adapted to receive fixating screws (shown as 107 in FIGS. 1B-1D) for fixating the transparent polymer windshield 101 to the metal frame 102, 103. The through holes have a cross sectional area being at least 1.5 times the size of the cross sectional area of the screws, enabling the transparent polymer windshield 101 to move in relation to the metal frame 102, 103.

The absorbing vehicle window arrangement 100 being flexible in the horizontal direction H enables the window arrangement 100 to adjust to the specific dimensions of a specific vehicle cab, as the measurements of the vehicle cab of the same make and model still differ enough to make fitting of a substantially stiff metal frame difficult.

When the shockwave of a nearby detonation hits the window arrangement 100, the transparent polymer window flexes in the frame and absorbs the shock by moving the through holes, against the support from the inner portion of the metal frame 103. After the explosion a vacuum arises at the location of the blast which creates a suction exerted on the absorbing window arrangement. At this time, the transparent polymer windshield 101 moves in the fixation by the through holes against the support from the outer portion of the metal frame 102.

Figure 1B:
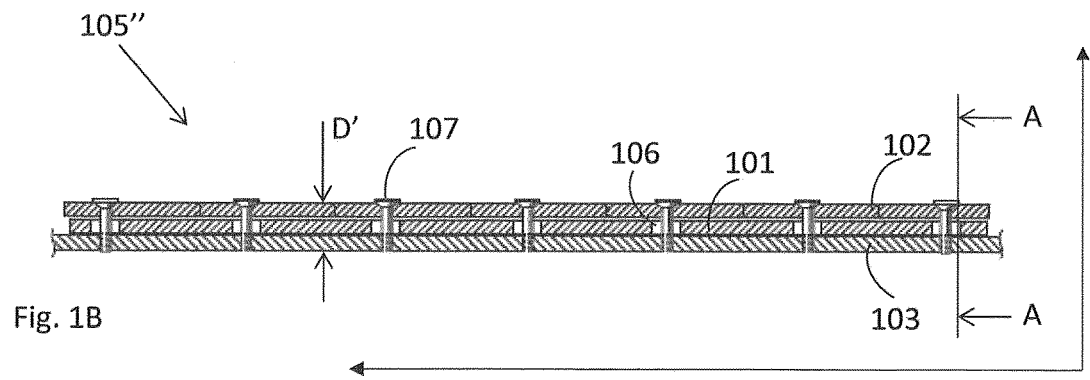
FIG. 1B shows one embodiment of part of a shock absorbing vehicle window arrangement, a flexible portion 105', 105" having a depth D', cross sectional side view.

FIG. 1B shows a sectional detailed view of the flexible portion 105" of the lower horizontally extending portion (shown as 104" in FIG. 1A) when the flexible portion 105" is in its unbent state. The top portion of the section is the outer portion 102 of the metal frame extending along the edge of the transparent polymer windshield 101 and overlaps the transparent polymer windshield 101 in the sectional direction of FIG. 1B. The through holes 106 of the transparent polymer windshield 101 are shown offering the clearance fit necessary for the flexibility and the movement of the transparent polymer windshield 101 in relation to the outer and inner portions of the metal frame 102, 103. In the embodiment shown in FIG. 1B, the screws used to fixate the transparent polymer windshield 101 are fixated by means of threaded holes in the inner portion of the metal frame 103. While the inner portion of the metal frame comprises threaded holes, the through holes of the outer portion of the metal frame are without threads, which enable the screws 107 to fixate the transparent polymer windshield 101 to the metal frame by means of a clamping fit.

Figure 1C:
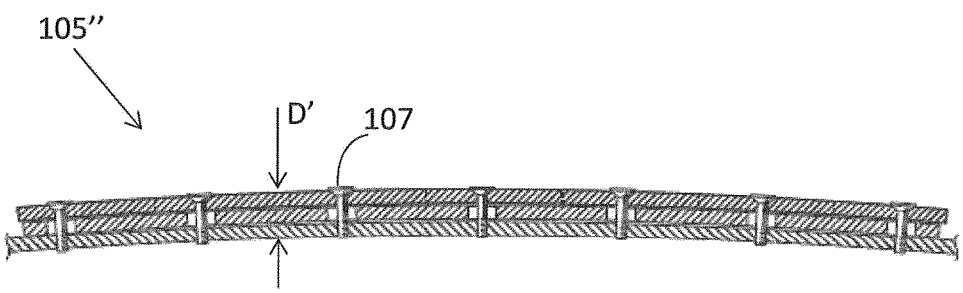
FIG. 1C shows one embodiment of part of a shock absorbing vehicle window arrangement, a flexible portion 105', 105" having a depth D', further showing the fixating screws 107 for fixating the transparent polymer windshield 101 to the metal frame 102, 103, cross sectional side view.

FIG. 1C shows a sectional detailed view of the flexible portion 105" of the lower horizontally extending portion when the flexible portion 105" is in its bent state, which have caused the transparent polymer windshield 101 to move in relation to the outer and inner portions of the metal frame 102, 103. According to the embodiment shown in FIG. 1C, the flexible portion 105" of the horizontally extending portion is flexible and has an elasticity exceeding 20 mm/m. However, in conceivable alternative embodiments, the flexible portion 105" has an elasticity exceeding 10 mm/m, and in alternative embodiments, the flexible portion 105" has an elasticity exceeding 25 mm/m, alternative embodiments, the flexible portion 105" has an elasticity exceeding 30 mm/m.

Figure 1D:
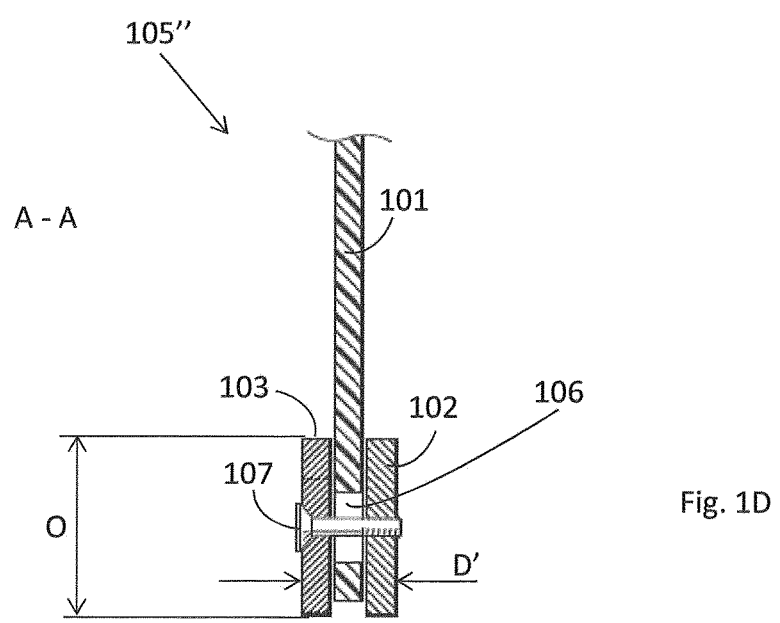
FIG. 1D shows one embodiment of part of a shock absorbing vehicle window arrangement, the fixating screws 107 for fixating the transparent polymer windshield 101 to the metal frame 102, 103, cross sectional side view.

FIG. 1D shows a section A-A of the flexible portion 105" showing the overlap O between the transparent polymer windshield 101 and the inner and outer portions of the metal frame 102, 103. In a situation where the transparent polymer windshield 101 is exposed to the energy of shock wave of a blast, the vacuum following the blast or force from the impact of an object against the windshield, the inner and outer portions of the metal frame 102, 103 supports the transparent polymer windshield 101 and makes sure that the windshield remains fixated to the frame and thus protects the inside of the vehicle cab.

In the embodiment shown in FIGS. 1A-1F, the overlap exceeds 1% of the length of the windshield in the direction extending perpendicular from the length axis LA of the outer portion 102 of the metal frame, and in another conceivable embodiment the overlap exceeds 2% of the length of the windshield in the direction extending perpendicular from the length axis LA of the outer portion 102 of the metal frame and yet in another conceivable embodiment the overlap exceeds 3% of the length of the windshield in the direction extending perpendicular from the length axis LA of the outer portion 102 of the metal frame.

In the embodiment shown in FIG. 1A, the overlap exceeds 20 mm, and in another conceivable embodiment the overlap exceeds 10 mm, and in another conceivable embodiment the overlap exceeds 30 mm, and in another conceivable embodiment the overlap exceeds 40 mm.

Figure 1E:
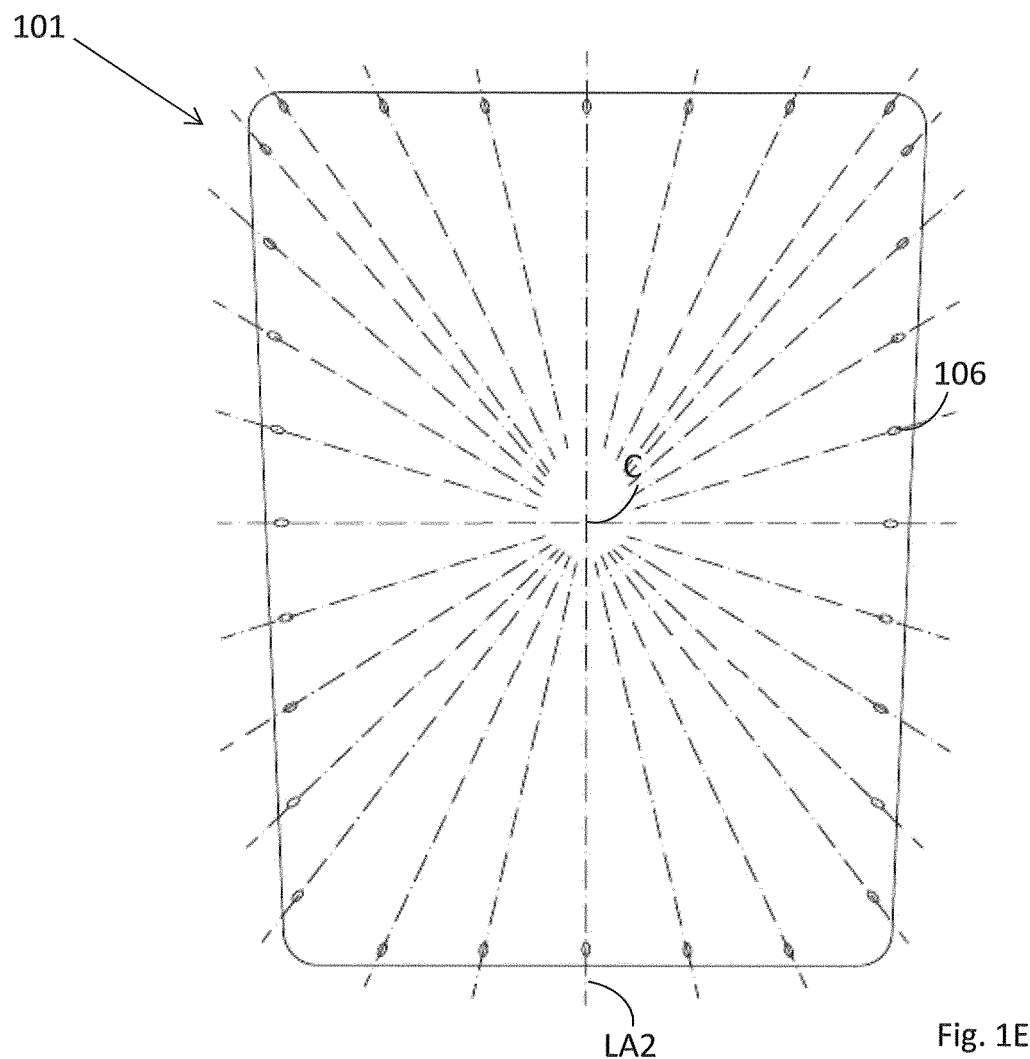
FIG. 1E shows one embodiment of part of a shock absorbing vehicle window arrangement, wherein the length of the stadium shaped holes 106 are extending in a direction facing the center of the transparent polymer windshield 101, front view.
Figure 1F:
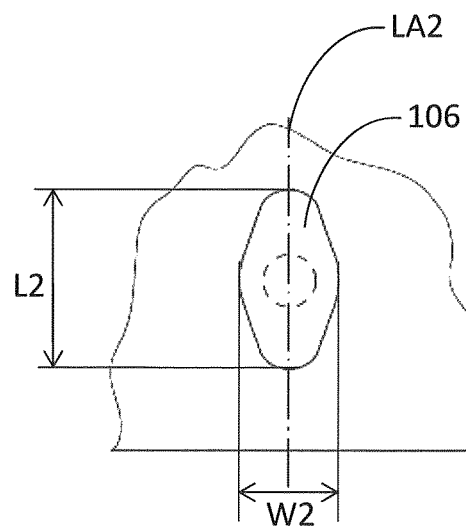
FIG. 1F shows one embodiment of part of a shock absorbing vehicle window arrangement, the through Stadium shaped holes 106, front view.

FIGS. 1E and 1F shows an isolated view of the transparent polymer windshield of the embodiment of FIGS. 1A-1F. In the embodiment shown in FIG. 1E, the transparent polymer windshield comprises evenly distributed through holes 106 adapted to receive screws for fixating the transparent polymer windshield to the metal frame 102, 103 (such as also described with reference to FIG. 1B). The through holes 106 of the present embodiment are stadium shaped (which is shown in detail in FIG. 1F). The length axis LA2 extending in the direction of the length L of the stadium shaped through hole 106 extends in a direction from the center of the through hole 106 to the center C of the transparent polymer windshield. As can be seen from FIG. 1E, the length axis of all of the evenly distributed through holes extends in a direction towards the center C of the transparent polymer windshield, which means that the center point C is the point in which the transparent polymer windshield 101 can flex maximally, which enables the transparent polymer windshield 101 to absorb a maximum amount of energy from a blast or an impact.

In the embodiment shown in FIGS. 1A-1F, the through holes have a cross sectional area exceeding 1.5 times the size of the screw to be placed in the through hole, enabling the windshield to flex. However, in alternative embodiments, the through holes may have a cross sectional area exceeding 2 times the size of the screw to be placed in the through hole, or exceeding 3 times the size of the screw to be placed in the through hole, or exceeding 4 times the size of the screw to be placed in the through hole.

Further, the stadium shape of the through hole 106 is to be understood as an example of a suitable shape for the through hole. In alternative embodiments, the through hole may have another shape, such as elliptical or circular, as long as the clearance fit is enabled.

In the embodiment of FIGS. 1A-1F, the transparent polymer windshield is made from Polycarbonate, which is a see through polymer material that implies that the window is 300 times as strong as ordinary glass. It also has a much lower weight, approximately half the weight of glass. Further, the window of the shock absorbing vehicle window arrangement may be coated with a thin layer of coating, providing higher resistance against chemicals and is more ware resistant. Said coating for example comprises an oxide of silicone, more preferably silica. The coating further implies a UV resistance up to 99.96%. Further yet, the window implies diffusion proof qualities along with self extinguishing features and is recyclable.

Figure 2A:
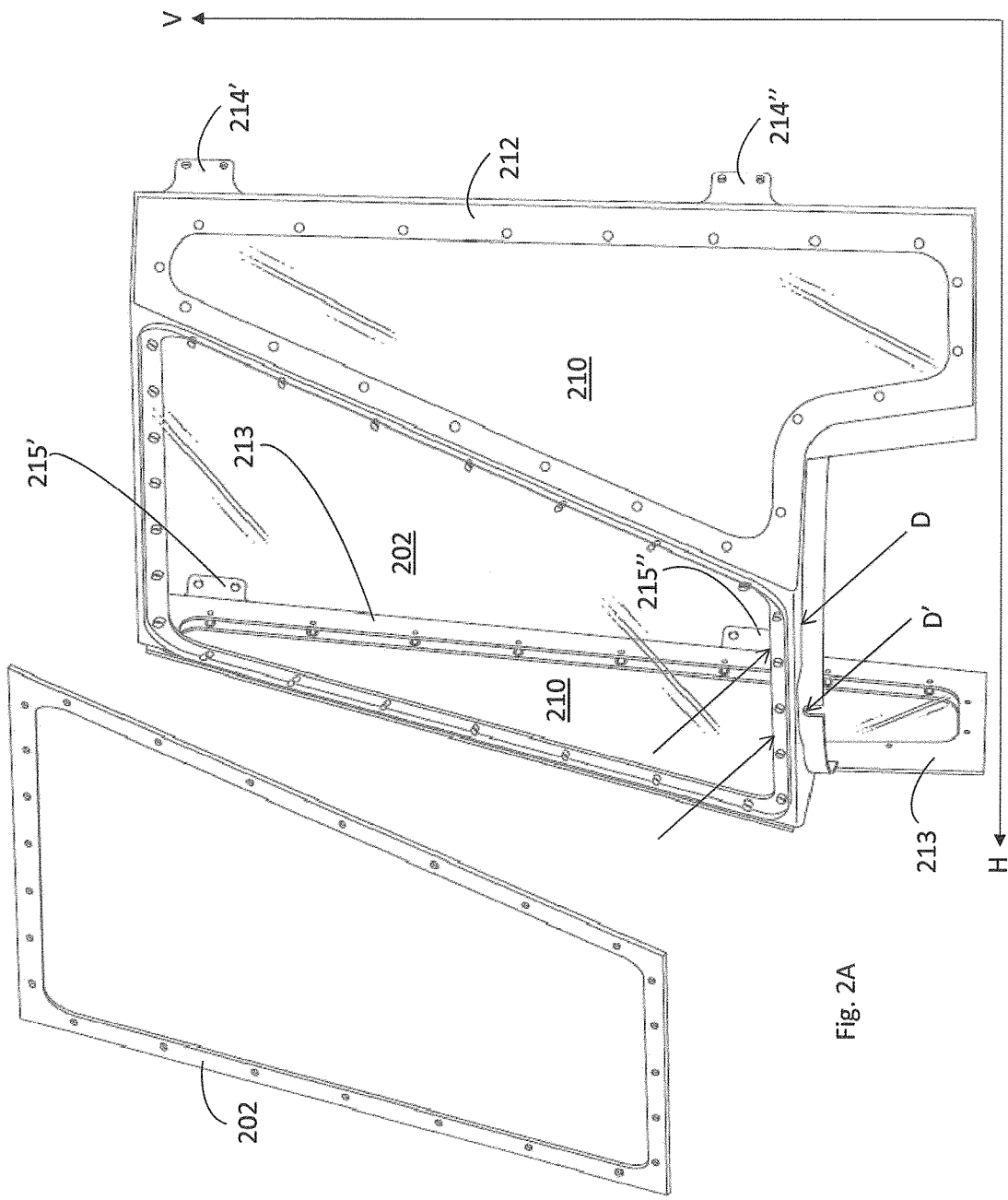
FIG. 2A shows one embodiment of a shock absorbing vehicle window arrangement, comprising front window and side windows perspective view.

FIG. 2A shows another embodiment of a shock absorbing vehicle window arrangement for a vehicle cab. The shock absorbing vehicle window arrangement comprises a transparent polymer windshield 201 enclosed by a metal frame 202, 203 having a depth D extending in the direction perpendicular to the plane of the transparent polymer windshield 201. The metal frame comprises an outer portion 202, being the portion 202 of the metal frame extending on the outside of the transparent polymer windshield 201, and an inner portion 203, being the portion of the metal frame extending on the inside of the transparent polymer windshield 201.

As shown in FIG. 2A, the shock absorbing vehicle arrangement comprises a front window, the transparent polymer windshield 201 and transparent polymer side windows 210' and 210". The transparent polymer side windows 210' and 210" are placed at an angel $\alpha$ from the transparent polymer windshield 201, allowing the transparent polymer windshield 201 facing forward and the transparent polymer side windows 210' and 210" facing sideward in relation to the forward driving direction of the vehicle. Transparent polymer side window 210' being placed to the right side and transparent polymer side window 210" being placed to the left side, in relation to the forward driving direction of the vehicle.

The transparent polymer side windows 210' and 210" being enclosed by a side metal frame 212, 213. The side metal frame comprises an outer portion 212, being the portion 212 of the metal frame extending on the outside of the transparent polymer side windows 210', 210", and an inner portion 213, being the portion of the metal frame extending on the inside of the transparent polymer side windows 210', 210". In alternative embodiments, it is equally conceivable that the metal frame 202, 203 and the side metal frame 212, 213 is comprised of one portion, materially connected as it is that the metal frame 202, 203 and the side metal frame 212, 213 is comprised of separate portions which are not materially integrated with each other.

In the embodiment shown in FIG. 2A, the side metal frame 212, 213 further comprises upper and lower fixating elements 214', 214" for fixating the shock absorbing window arrangement. Each of the fixating elements 214', 214" is arranged with through holes and in the embodiment shown in FIG. 2A, each fixating element 214', 214" comprises two through holes placed at a distance. However, in alternative embodiments, the fixating elements 214', 214" may comprise one through hole, or comprise three through holes, or comprise more than three through holes.

The flexibility of the shock absorbing window arrangement is mainly related to the upper and lower horizontally extending portions (which are shown in detail in FIG. 1A) each comprising a flexible portion (which is shown in detail in FIG. 1A), which may be a small portion of the horizontally extending portions, such as the central portion, or which may be the entire horizontally extending portion. The flexibility of the shock absorbing window arrangement enables adjustment of the position of the fixating element 214', 214" implying a better fit and larger compatibility with a larger number of vehicles. According to the embodiment shown in FIG. 2A, the flexible portion (which is shown in detail in FIG. 1) of the horizontally extending portion is flexible and have a range of motion (or ROM), the distance that a movable object may normally travel while properly attached to another, of 20 mm exceeding 2%. This indicates that the center point of the window can move or be displaced by 2.0%. However, in conceivable alternative embodiments, the flexible portion has an elasticity exceeding 1%, and in alternative embodiments, the flexible portion has an elasticity exceeding 2.5% and in alternative embodiments, the flexible portion has an elasticity exceeding 3%. The flexible movement is further facilitating adjustment of the angle $\alpha$ between the transparent polymer windshield (101) and the transparent polymer windows (210', 210").

In alternative embodiments, the metal frame does not comprise protruding fixation elements. The fixation elements may in such embodiments be replaced by fixation elements in the form of through holes in the metal frame integrated in the vertically and/or horizontally extending portions of the metal frame which may create a more even distribution of tensions and a more symmetric look. Integrating the holes in the metal frame may also reduce material waste in manufacturing. The through holes in the metal frame may be positioned such that they correspond with fixating holes which are already present in the vehicle cab, or which may be drilled for the sole purpose of fixating the shock absorbing vehicle window arrangement. In embodiments where protruding fixation elements are replaced by integrated fixation elements, a flexible portion of a horizontally extending portion may enable the distance between the integrated fixation elements on either side of the transparent polymer windshield to be adjusted by a length exceeding one of 5 mm, 10 mm, 15 mm, 20 mm and 30 mm.

Figure 2B:
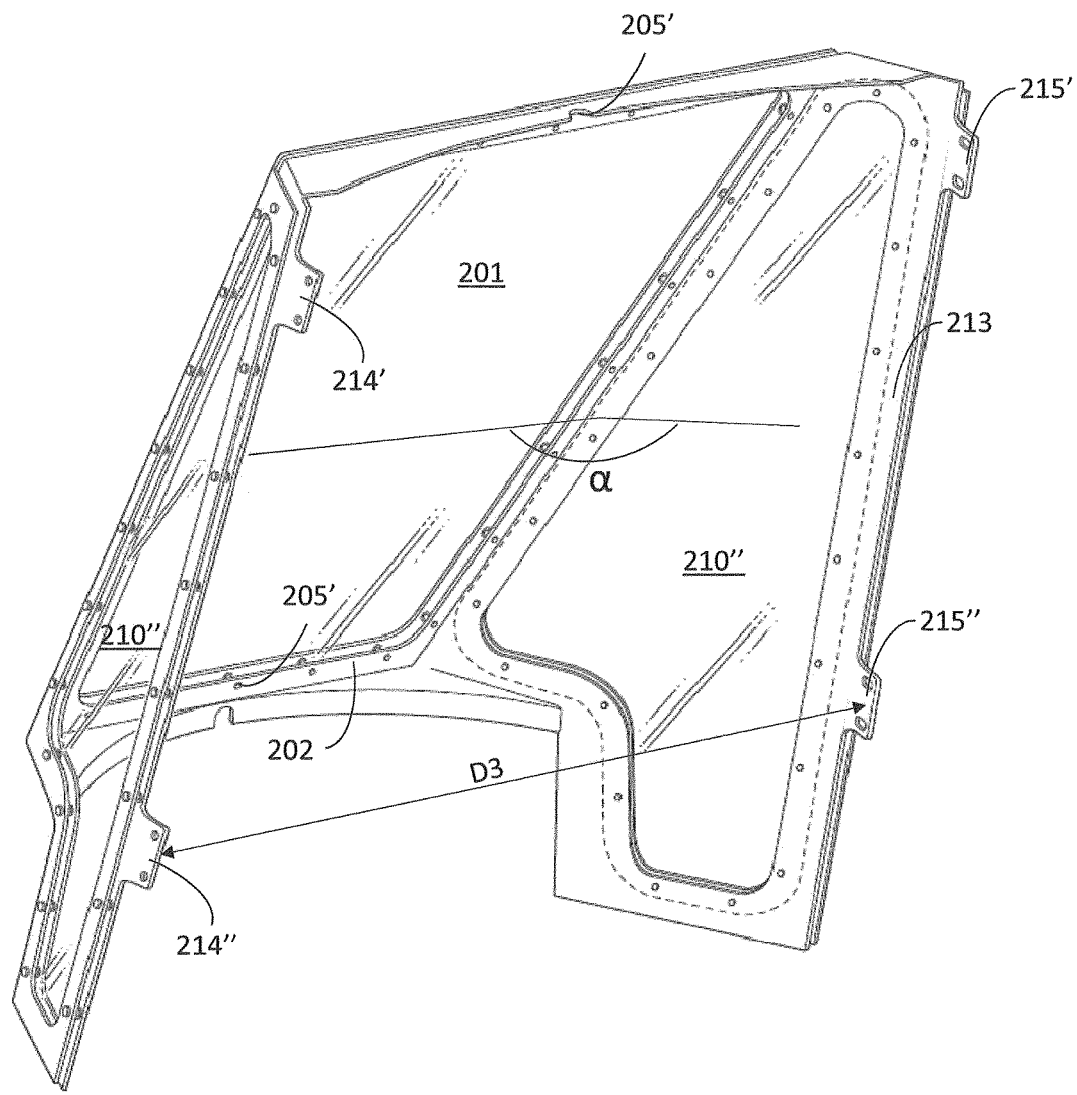
FIG. 2B shows one embodiment of a shock absorbing vehicle window arrangement, comprising the front window perspective view.

FIG. 2B shows another embodiment of a shock absorbing vehicle window arrangement for a vehicle cab. The window arrangement comprises a transparent polymer windshield 201 enclosed by a metal frame 202. The metal frame 202 comprises an upper 205' and lower 205" horizontally extending portion, which portions in the embodiment of FIG. 2 is an integrated part of the metal frame 202 which encloses the entire edge of the transparent polymer windshield 201. In alternative embodiments, it is equally conceivable that the metal frame is comprised of several portions which are not materially integrated with each other.

The upper and lower horizontally extending portions 205', 205" each comprises a flexible portion (which is shown in detail in FIG. 1A) which may be a small portion of the horizontally extending portions, such as the central portion, or which may be the entire horizontally extending portion 205', 205'". Further, the steel frame is more stiff and rigid in the upper extending portion 205' than the lower extending portion 205", allowing the lower extending portion 205" to be more flexible. In one specific example of an embodiment of the present invention, the window is 12 mm thick and the dimensions of the steel used in the frame are 5 mm on the outside and on the inside. The outer frame is 43 mm on the side of the frame (W), and 63 mm (W; W') of the top part and bottom part of the frame.

Further, FIG. 2B illustrates the transparent polymer side windows 210' and 210" being enclosed by a side metal frame 213 extending on the inside of the frame. The frame is in one embodiment made of a rigid and stiff material able to counteract to some extent on the large forces projected during for example an explosion. In one embodiment the frame is made of steel, more preferably of 355S, that is a higher quality of steel but other materials are thinkable.

The side metal frame 213 further comprises upper and lower fixating elements 214', 214", 215', 215" for fixating the shock absorbing window arrangement. The lower fixating elements 214", 215" being placed at a distance D3 apart. In one embodiment the shock absorbing window arrangement comprises at least one fixation element, and a second fixation element, and wherein the two fixation elements are placed such that the flexible portion (105', 105") is placed between the two fixation elements, such that the flexible portion enables a variation of the distance D3 between the two fixation elements exceeding one of 5 mm, 10 mm, 15 mm, 20 mm and 30 mm. In the embodiment of FIGS. 2A-2B the fixation elements 214', 214", 215', 215" are materially integrated in the inner portion of the metal frame 203. However, in alternative embodiments it is equally conceivable that the fixation elements are materially separated from the metal frame.

Please note that the embodiments above can be combined within the scope of the appended claims unless such combinations are clearly contradictory.

The invention claimed is:

1. A shock absorbing vehicle window arrangement (100) for a vehicle cab, the window arrangement comprises a transparent polymer windshield (101; 201), a metal frame (102, 103; 202, 203) having a width W extending in a direction parallel to a plane of the transparent polymer windshield (101; 201) and a depth D extending in a direction perpendicular to a plane of the transparent polymer windshield (101; 201), the metal frame (102, 103; 202, 203) comprising:
    an outer portion (102; 202), at least partially extending on an outside of the transparent polymer windshield (101; 201), and
    an inner portion (103; 203), at least partially extending on an inside of the transparent polymer windshield (101; 201), wherein
    the outer portion overlaps (O) the transparent polymer windshield (101; 201) with at least 0.5% of a length of the transparent polymer windshield (101; 201),
    the metal frame (102, 103; 202, 203) further comprises a horizontally extending portion (104', 104") comprising a flexible portion (105', 105") having a depth (D') which is less than half of the width (W') of the flexible portion (105', 105"), and wherein
    the transparent polymer windshield (101; 201) comprises through holes (106) adapted to receive fixating screws (107) for fixating the transparent polymer windshield (101; 201) to the metal frame (102, 103; 202, 203), and wherein the through holes (106) have a cross sectional area being at least 1.5 times the cross sectional area of the screws, enabling movement between the metal frame (102, 103; 202, 203) and the transparent polymer windshield (101; 201), and wherein the absorbing vehicle window arrangement (100) is more flexible along a horizontal direction (H) than along a vertical direction (V).

2. The shock absorbing vehicle window arrangement (100) according to claim 1 wherein the through holes (106) are Stadium shaped holes.

3. The shock absorbing vehicle window arrangement (100) according to claim 2 wherein the length of the stadium shaped holes (106) are extending in a direction facing the center (C) of the transparent polymer windshield (101; 201).

4. The shock absorbing vehicle window arrangement (100) according to claim 1, wherein said shock absorbing vehicle window arrangement (100) further comprises a first and second side window (210', 210").

5. The shock absorbing vehicle window arrangement (100) according to claim 4, wherein angles (α) between planes of the side windows (210', 210") and the plane of the transparent polymer windshield (101; 201) can be adjusted by the flexibility of the flexible portion (105', 105").

6. The shock absorbing vehicle window arrangement (100) according to claim 1, wherein the overlap (O) is exceeding 20 mm.

7. The shock absorbing vehicle window arrangement (100) according to claim 1, wherein the transparent polymer windshield (101; 201) is made from Polycarbonate.

8. The shock absorbing vehicle window arrangement (100) according to claim 1, wherein the metal frame (102, 103; 202, 203) extends along the entire outer edge of the transparent polymer windshield (101; 201).

9. The shock absorbing vehicle window arrangement (100) according to claim 1, wherein the metal frame (102, 103; 202, 203) further comprises an inner portion (103, 203), and wherein the transparent polymer windshield (101; 201) is adapted to be placed between the inner portion (103; 203) and the outer portion (102; 202) of the transparent polymer windshield (101; 201).

10. The shock absorbing vehicle window arrangement (100) according to claim 1, further comprising at least one fixation (214') element for fixating the shock absorbing vehicle window arrangement (100) to a vehicle cab.

11. The shock absorbing vehicle window arrangement (100) according to claim 10, wherein the shock absorbing vehicle window arrangement (100) comprises the at least one fixation element (214'), and a second fixation element (215'), and wherein the two fixation elements are placed such that the flexible portion (105', 105") is placed between the two fixation elements (214', 215'), such that the flexible portion enables a variation of the distance (D3) between the two fixation elements (214', 215') exceeding 10 mm.

12. The shock absorbing vehicle window arrangement (100) according to claim 10, wherein the fixation elements (214', 214", 215', 215") are materially integrated in the inner portion (103) of the metal frame (102, 103; 202, 203).

13. The shock absorbing vehicle window arrangement (100) according to claim 1, wherein a center point of the transparent polymer windshield (101; 201) can be moved at least 2% in relation to the metal frame (102, 103; 202, 203).

14. The shock absorbing vehicle window arrangement (100) according to claim 1, wherein a center point (C) of the transparent polymer windshield (101; 201) can be moved at least 4% in relation to the metal frame (102, 103; 202, 203).

* * * * *